United States Patent [19]

Struck et al.

[11] Patent Number: 4,522,418
[45] Date of Patent: Jun. 11, 1985

[54] STEERABLE WHEEL SUSPENSION ARRANGEMENT

[75] Inventors: Helmut Struck, Winnenden; Karl H. Richter, Kernen im Remstal; Michael Klein, Waiblingen; Ulrich Ruth, Stuttgart; Walter Ulke, Neuhausen, all of Fed. Rep. of Germany

[73] Assignee: Daimler-Benz Aktiengesellschaft, Fed. Rep. of Germany

[21] Appl. No.: 491,043

[22] Filed: May 3, 1983

[30] Foreign Application Priority Data

May 5, 1982 [DE] Fed. Rep. of Germany ....... 3216728

[51] Int. Cl.³ .......................... B62D 7/08; B62D 7/16
[52] U.S. Cl. .................. 280/95 A; 280/673; 280/675
[58] Field of Search ............. 280/93, 95 R, 95 A, 280/771, 673, 674, 675

[56] References Cited

U.S. PATENT DOCUMENTS 2,841,412  7/1958  Mineck ........................... 280/95 A

FOREIGN PATENT DOCUMENTS 585016   2/1925   France.
1346790  11/1963  France.
444922   3/1936   United Kingdom ............. 280/95 R
515974   12/1939  United Kingdom ............. 280/95 R
1353075  5/1974   United Kingdom ............. 280/95 R Primary Examiner—John A. Pekar
Assistant Examiner—Kenneth R. Rice
Attorney, Agent, or Firm—Barnes & Thornburg

[57] ABSTRACT

In motor vehicles, in particular passenger cars possessing an axle or axles with steerable wheels, the steering-gear box is conventionally located asymmetrically with respect to the center-line. The result of this on the steering linkage is that the linkage part-sections between the steering-gear box and each of the wheels are of different design. This asymmetry can give rise to differences in the wear of the tires on these wheels, and is advantageously avoided according to this invention by making the overall stiffness values of the two part-sections identical, irrespective of the design-differences.

10 Claims, 1 Drawing Figure

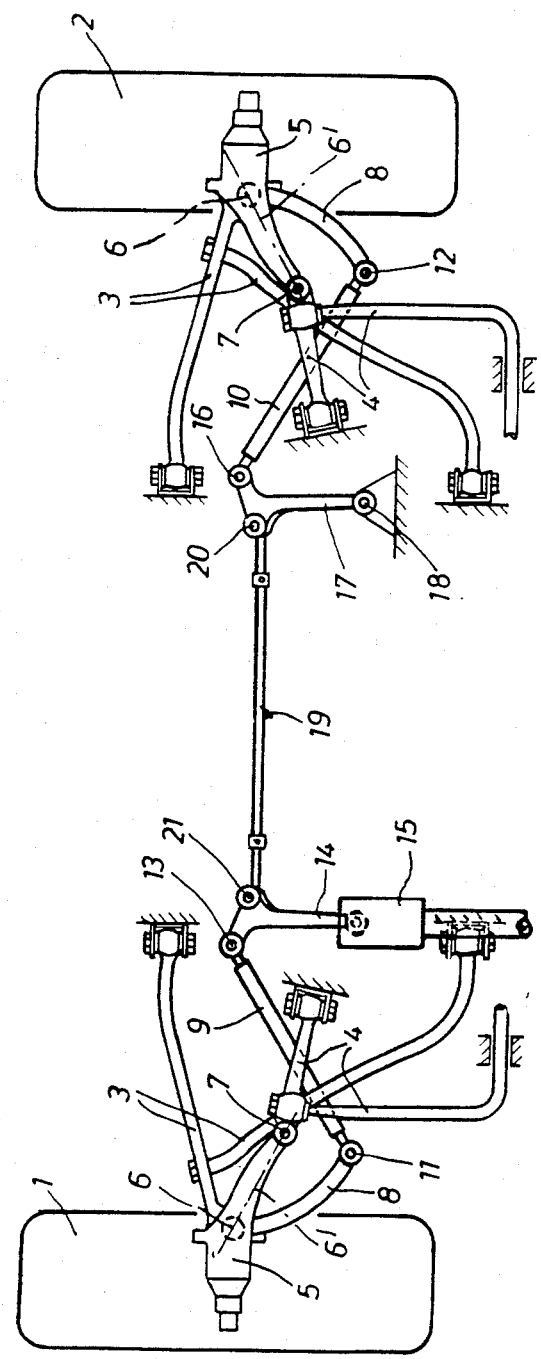

STEERABLE WHEEL SUSPENSION ARRANGEMENT

BACKGROUND AND SUMMARY OF THE INVENTION

The invention relates to a wheel suspension arrangement for steerable wheels on a motor vehicle, especially for passenger cars and the like. In such arrangements the wheels are respectively steerably connected to a steering-gear box via a steering linkage which is composed of two part-sections starting from the steering-gear box. These part-sections are of different construction since the steering-gear box is asymmetrically located with respect to the vehicle longitudinal center plane.

In motor vehicles of the type described above, it has been found that unequal tire-wear can result. Especially under extreme driving conditions involving frequent cornering, increased wear takes place on the outside shoulder of the front wheel on the side on which the steering-gear box is located, for example, on the left-hand side in the case of left-hand-drive vehicles.

An object of the invention is to cure this uneven tire-wear, and to ensure that the tire-wear is as uniform as possible, and hence to ensure that the tire-wear is also low per se.

This object is achieved according to the invention by providing that the overall stiffness of one of the two part-sections of the steering linkage is equal to the overall stiffness of the other part-section.

The solution according to the invention is based on the knowledge that the different construction of the two part-sections of the steering linkage can lead to discrepancies between the overall stiffness values for the two part-sections, and that, even if these discrepancies are only comparatively small, they can give rise to an effect, especially in the case of heavy and fast vehicles, whereby heavier wear occurs on the outside shoulder of the wheel with the stiffer connection to the steering-gear box, namely with the stiffer section of the steering linkage.

Since, in the normal case, the rods of the steering linkage are adequately rigid with regard to the loads which occur, the differences in the overall stiffness values of the part-sections result from the elasticities which are unavoidably present in the joints. However, joints which are constructed differently exhibit certain differences in their elasticities, so that a particularly simple embodiment takes the form of matching the overall stiffness values of the part-sections by appropriate selection of the joints comprised therein. This is effected, most simply, when joints of different designs are used, according to a procedure whereby the joints which due to their design are softer, are used in the part-section with the smaller number of joints, while the joints which due to their design are harder, are used in the part-section with the larger number of joints.

German published application (Offenlegungsschrift) No. 2,034,667 is of interest in showing varied elasticity joints for steering linkages.

These and further objects, features, and advantages of the present invention will become more obvious from the following description when taken in connection with the accompanying drawing which shows, for purposes of illustration only, a single embodiment in accordance with the present invention.

BRIEF DESCRIPTION OF THE DRAWING

The single drawing FIGURE is a schematic plan view of a suspension system for steerable wheels constructed in accordance with a preferred embodiment of the invention.

DETAILED DESCRIPTION OF THE DRAWING

In the drawing, the left-hand and right-hand wheels are respectively marked 1 and 2, and each of the two wheels is held by means of a wheel-suspension system, which is composed essentially of a lower swinging arm 3 and an upper swinging arm 4. These swinging arms 3 and 4 permit the wheel-carrier 5 in question to be pivoted about an upward-pointing axis, forming the steering axis 6'. This steering axis 6' is defined by the points at which the swinging arms 3 and 4 are coupled to the wheel-carrier 5, these points being formed by the joints 6 and 7 respectively. A steering arm 8 is rigidly connected to each wheel-carrier 5.

A respective track rod 9 and 10, is coupled to each steering arm 8, and in particular via a respective joint 11, 12. The track rod 9 which is installed on the left-hand side is, in addition, connected directly to the steering-gear lever 14 of the steering-gear box 15 via a joint 13, the steering-gear box 15 being installed in a rigid manner. The track rod 10 on the right-hand side is connected, via a joint 16 to an intermediate steering-gear lever 17, which corresponds to the steering-gear lever 14, and which can be pivoted in a known manner about an axis 18. The steering rod 19 extends between the intermediate steering-gear lever 17 and the steering-gear lever 14, this rod 19 being connected to the intermediate steering-gear lever 17 via a joint 20, and to the steering-gear lever 14 via a joint 21.

In accordance with the left-hand-drive configuration, in which the steering-gear box 15 is located on the left-hand vehicle side, two joints 11 and 13 are located in the part-section of the steering linkage on the left-hand side, together with the track rod 9. On the right-hand side, the track rod 10, the intermediate steering-gear lever 17, the steering rod 19, and the associated joints 12, 16, 20 and 21 are located in the part-section of the steering linkage. Should all of these joints 11, 13 and 12, 16, 20, 21 be equally stiff, a lower overall stiffness value would accordingly result in the part-section on the right-hand side. This lower overall stiffness is compensated by arranging for at least one of the joints in this part-region to possess a higher stiffness. However, joints which are identical among themselves, are preferably used for the particular part-section on each side, right and left, those on the left-hand side being softer than those on the right-hand side. The use of different joints in this way, for the right-hand side and the left-hand side, renders assembly errors less probable, especially when the joints used are of different types which can be recognized by their external appearance.

The solution according to the invention enables uneven tire-wear to be avoided by simple means.

While we have shown and described a preferred embodiment in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

We claim:

1. Motor vehicle, in particular a passenger car, possessing an axle with steerable wheels, on which axle the wheels are connected to a steering-gear box via a steering linkage which, starting from the steering box, is composed of two part sections containing a plurality of linkage member connection joints, each part section including joints of different construction than the joints of the other part section each part section interconnecting one of the wheels with the steering-gear box, wherein the overall stiffness of one of the two part sections is equal to the overall stiffness of the other part section.

2. Motor vehicle according to claim 1, the two part-sections possessing different numbers of joints, wherein the joints of the two part-sections are designed to have stiffness values such that the total stiffness of the joints which are located in one part-section is equal to the total stiffness of the joints which are located in the other part-section.

3. Motor vehicle according to claim 2, wherein the joints of one part-section are, in each case, identical among themselves.

4. A wheel suspension arrangement for a pair of steerable wheels on a vehicle which has a steering box disposed at one side of the vehicle, comprising
   a first steering linkage section interconnecting the steering box with a first of the steerable wheels,
   a second steering linkage section interconnecting the steering box with a second of the steerable wheels, said second steering linkage section including joints of different construction than joints of said first steering linkage section,
   wherein the overall stiffness resistance of the first and second linkage section is equal, whereby the asymmetrical location of the steering box is accommodated for and even tire-wear is obtained at both wheels.

5. An arrangement according to claim 4, wherein each of said linkage sections include a plurality of linkage member connection joints, and wherein the total stiffness of the joints in the first linkage section is equal to the total stiffness of the joints in the second linkage section.

6. An arrangement according to claim 5, wherein the first and second linkage sections have different members of joints.

7. An arrangement according to claim 6, wherein the joints in the first linkage section all have the same stiffness.

8. An arrangement according to claim 7, wherein the joints in the second linkage section all have the same stiffness.

9. An arrangement according to claim 8, wherein the steering box is located at the side of the first wheel, and wherein the first linkage section has fewer joints than does the second linkage section.

10. An arrangement according to claim 5, wherein the steering box is located at the side of the first wheel, and wherein the first linkage section has fewer joints than does the second linkage section.

* * * * *